US008688174B2

(12) United States Patent
Latham et al.

(10) Patent No.: US 8,688,174 B2
(45) Date of Patent: Apr. 1, 2014

(54) INTEGRATED, DETACHABLE EAR BUD DEVICE FOR A WIRELESS PHONE

(75) Inventors: Weldon H. Latham, Bethesda, MD (US); Timothy J. Lorello, Gambrills, MD (US); Drew Morin, Davidsonville, MD (US); Bruce White, Arnold, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 13/419,180

(22) Filed: Mar. 13, 2012

(65) Prior Publication Data
US 2013/0244734 A1  Sep. 19, 2013

(51) Int. Cl.
*H04M 1/00* (2006.01)
*H04R 25/00* (2006.01)

(52) U.S. Cl.
USPC ...................... 455/569.1; 455/575.2; 381/370

(58) Field of Classification Search
USPC .......... 455/575.2, 556.1, 569.1, 575.1, 575.6; 381/370, 384, 374
See application file for complete search history.

(56) References Cited

U.S. PATENT DOCUMENTS

| 1,103,073 | A | 7/1914 | O'Connell |
|---|---|---|---|
| 4,445,118 | A | 4/1984 | Taylor |
| 4,651,156 | A | 3/1987 | Martinez |
| 4,706,275 | A | 11/1987 | Kamil |
| 4,891,638 | A | 1/1990 | Davis |
| 4,891,650 | A | 1/1990 | Sheffer |
| 4,928,107 | A | 5/1990 | Kuroda |
| 4,952,928 | A | 8/1990 | Caroll et al. |
| 4,972,484 | A | 11/1990 | Theile |
| 5,014,206 | A | 5/1991 | Scribner et al. |
| 5,043,736 | A | 8/1991 | Darnell et al. |
| 5,055,851 | A | 10/1991 | Sheffer |
| 5,068,656 | A | 11/1991 | Sutherland |
| 5,068,891 | A | 11/1991 | Marshall |
| 5,070,329 | A | 12/1991 | Jasinaki |
| 5,081,667 | A | 1/1992 | Drori et al. |
| 5,119,104 | A | 6/1992 | Heller |
| 5,126,722 | A | 6/1992 | Kamis |

(Continued)

OTHER PUBLICATIONS

B.W. Parkinson et al., Global Positioning System: Theory and Applications, vol. 1, Progress in Astronautics and Aeronautics, vol. 163, American Institute of Aeronautics and Astronautics, Inc., p. 184-187, 1996.

(Continued)

*Primary Examiner* — Sonny Trinh
(74) *Attorney, Agent, or Firm* — Tarolli, Sundheim, Covell & Tummino LLP

(57) ABSTRACT

An integrated, detachable ear bud system that is attached to an associated wireless phone. The integrated, detachable ear bud system may be one ear bud, or pair of ear buds, or ear bud or ear buds including a microphone. In certain embodiments an integrated, detachable, attached auditory device is physically connected to its associated wireless phone via an extendable and retractable electrical cord, and integrated into the case of the associated wireless phone, to forcibly keep with the wireless phone even when not in use, preventing misplacement, loss, or even inadvertent separation from the wireless device. The ear buds may connect to a recharge port on the wireless phone, and be charged when the wireless phone is charging. When in its attached home position, the ear-mountable speaker may tuck into a mating cavity. A latch or magnet may assist in attaching the integrated, detachable ear bud to the wireless phone.

13 Claims, 11 Drawing Sheets

(56) References Cited

U.S. PATENT DOCUMENTS

| | | |
|---|---|---|
| 5,144,283 A | 9/1992 | Arens et al. |
| 5,161,180 A | 11/1992 | Chavous |
| 5,177,478 A | 1/1993 | Waggai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell et al. |
| 5,239,570 A | 8/1993 | Koster et al. |
| 5,265,630 A | 11/1993 | Hartmann |
| 5,266,944 A | 11/1993 | Caroll et al. |
| 5,283,570 A | 2/1994 | DeLuca |
| 5,289,527 A | 2/1994 | Tiedemann, Jr. |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon et al. |
| 5,327,529 A | 7/1994 | Fults |
| 5,334,974 A | 8/1994 | Simms et al. |
| 5,335,246 A | 8/1994 | Yokev |
| 5,343,493 A | 8/1994 | Karimullah et al. |
| 5,347,568 A | 9/1994 | Moody |
| 5,351,235 A | 9/1994 | Lahtinen |
| 5,361,212 A | 11/1994 | Class |
| 5,363,425 A | 11/1994 | Muffi et al. |
| 5,365,451 A | 11/1994 | Wang |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,396,558 A | 3/1995 | Ishiguro et al. |
| 5,398,190 A | 3/1995 | Wortham |
| 5,406,614 A | 4/1995 | Hara |
| 5,408,513 A | 4/1995 | Busch, Jr. et al. |
| 5,408,519 A | 4/1995 | Pierce et al. |
| 5,408,682 A | 4/1995 | Ranner et al. |
| 5,412,726 A | 5/1995 | Nevaux et al. |
| 5,418,537 A | 5/1995 | Bird |
| 5,422,813 A | 6/1995 | Schuchman |
| 5,423,076 A | 6/1995 | Westergren et al. |
| 5,432,841 A | 7/1995 | Kimer |
| 5,434,789 A | 7/1995 | Fraker et al. |
| 5,438,615 A | 8/1995 | Moen |
| 5,440,621 A | 8/1995 | Castro |
| 5,454,024 A | 9/1995 | Lebowitz |
| 5,457,737 A | 10/1995 | Wen |
| 5,461,390 A | 10/1995 | Hoshen |
| 5,465,289 A | 11/1995 | Kennedy, Jr. |
| 5,469,497 A | 11/1995 | Pierce et al. |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,485,505 A | 1/1996 | Norman et al. |
| 5,488,563 A | 1/1996 | Chazelle et al. |
| 5,494,091 A | 2/1996 | Freeman et al. |
| 5,497,149 A | 3/1996 | Fast |
| 5,502,761 A | 3/1996 | Duncan et al. |
| 5,504,491 A | 4/1996 | Chapman |
| 5,506,886 A | 4/1996 | Maine |
| 5,506,893 A | 4/1996 | Buscher et al. |
| 5,508,931 A | 4/1996 | Snider |
| 5,513,243 A | 4/1996 | Kage |
| 5,515,287 A | 5/1996 | Hakoyama et al. |
| 5,517,199 A | 5/1996 | DiMattei |
| 5,519,403 A | 5/1996 | Bickley et al. |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway et al. |
| 5,539,395 A | 7/1996 | Buss |
| 5,539,398 A | 7/1996 | Hall et al. |
| 5,539,829 A | 7/1996 | Lokhoff |
| 5,543,776 A | 8/1996 | L'Esperance et al. |
| 5,546,445 A | 8/1996 | Dennison |
| 5,552,772 A | 9/1996 | Janky et al. |
| 5,555,286 A | 9/1996 | Tendler |
| 5,568,119 A | 10/1996 | Schipper et al. |
| 5,568,153 A | 10/1996 | Beliveau |
| 5,574,648 A | 11/1996 | Pilley |
| 5,579,372 A | 11/1996 | Angstrom |
| 5,583,774 A | 12/1996 | Diesel |
| 5,588,009 A | 12/1996 | Will |
| 5,590,417 A * | 12/1996 | Rydbeck .................. 455/575.2 |
| 5,592,535 A | 1/1997 | Klotz |
| 5,594,780 A | 1/1997 | Wiedeman |
| 5,604,486 A | 2/1997 | Lauro et al. |
| 5,606,313 A | 2/1997 | Allen et al. |
| 5,606,618 A | 2/1997 | Lokhoff |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,628,600 A | 5/1997 | Pasquini |
| 5,629,693 A | 5/1997 | Janky |
| 5,633,630 A | 5/1997 | Park |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,724,667 A * | 3/1998 | Furuno .................. 455/575.2 |
| 5,731,785 A | 3/1998 | Lemelson |
| 5,740,534 A | 4/1998 | Ayerst et al. |
| 5,761,618 A | 6/1998 | Lynch et al. |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila et al. |
| 5,796,734 A | 8/1998 | Izawa et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,809,415 A | 9/1998 | Rossman |
| 5,812,086 A | 9/1998 | Bertiger |
| 5,812,087 A | 9/1998 | Krasner |
| 5,822,700 A | 10/1998 | Hult et al. |
| 5,828,740 A | 10/1998 | Khue et al. |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,898,391 A | 4/1999 | Jeffries |
| 5,920,821 A | 7/1999 | Seaholtz et al. |
| 5,922,074 A | 7/1999 | Richard |
| 5,930,250 A | 7/1999 | Klok |
| 5,930,701 A | 7/1999 | Skog |
| 5,943,399 A | 8/1999 | Bannister et al. |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts et al. |

(56) References Cited

U.S. PATENT DOCUMENTS

| | | |
|---|---|---|
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,055,413 A | 4/2000 | Morse |
| 6,058,300 A | 5/2000 | Hanson |
| 6,058,338 A | 5/2000 | Agashe |
| 6,061,018 A | 5/2000 | Sheynblat |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen et al. |
| 6,075,982 A | 6/2000 | Donovan et al. |
| 6,081,229 A | 6/2000 | Soliman |
| 6,081,508 A | 6/2000 | West et al. |
| 6,085,320 A | 7/2000 | Kaliski, Jr. |
| 6,101,378 A | 8/2000 | Barabash et al. |
| 6,121,923 A | 9/2000 | King |
| 6,122,503 A | 9/2000 | Daly |
| 6,122,520 A | 9/2000 | Want et al. |
| 6,124,810 A | 9/2000 | Segal |
| 6,131,067 A | 10/2000 | Girerd |
| 6,133,874 A | 10/2000 | Krasner |
| 6,134,483 A | 10/2000 | Vayanos |
| 6,147,598 A | 11/2000 | Murphy |
| 6,148,197 A | 11/2000 | Bridges et al. |
| 6,148,198 A | 11/2000 | Anderson et al. |
| 6,149,353 A | 11/2000 | Nilsson et al. |
| 6,150,980 A | 11/2000 | Krasner |
| 6,154,172 A | 11/2000 | Piccionelli |
| 6,169,891 B1 | 1/2001 | Gorham et al. |
| 6,169,901 B1 | 1/2001 | Boucher |
| 6,169,902 B1 | 1/2001 | Kawamoto |
| 6,173,181 B1 | 1/2001 | Losh |
| 6,178,506 B1 | 1/2001 | Quick, Jr. |
| 6,181,935 B1 | 1/2001 | Gossman et al. |
| 6,185,427 B1 | 2/2001 | Krasner |
| 6,188,354 B1 | 2/2001 | Soliman |
| 6,188,752 B1 | 2/2001 | Lesley |
| 6,188,909 B1 | 2/2001 | Alanara |
| 6,188,911 B1 | 2/2001 | Wallentin |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger et al. |
| 6,205,330 B1 | 3/2001 | Winbladh |
| 6,208,290 B1 | 3/2001 | Krasner |
| 6,208,854 B1 | 3/2001 | Roberts et al. |
| 6,208,870 B1 | 3/2001 | Lorello et al. |
| 6,215,441 B1 | 4/2001 | Moeglein |
| 6,223,046 B1 | 4/2001 | Hamill-keays et al. |
| 6,226,529 B1 | 5/2001 | Bruno et al. |
| 6,239,742 B1 | 5/2001 | Krasner |
| 6,247,135 B1 | 6/2001 | Feague |
| 6,249,680 B1 | 6/2001 | Wax et al. |
| 6,249,744 B1 | 6/2001 | Morita |
| 6,249,873 B1 | 6/2001 | Richard |
| 6,253,203 B1 | 6/2001 | O'Flaherty |
| 6,260,147 B1 | 7/2001 | Quick, Jr. |
| 6,263,212 B1 | 7/2001 | Ross et al. |
| 6,266,614 B1 | 7/2001 | Alumbaugh |
| 6,275,692 B1 | 8/2001 | Skog |
| 6,275,849 B1 | 8/2001 | Ludwig |
| 6,289,373 B1 | 9/2001 | Dezonno |
| 6,292,669 B1 | 9/2001 | Meuronen et al. |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman et al. |
| 6,321,257 B1 | 11/2001 | Kotala |
| 6,324,542 B1 | 11/2001 | Wright, Jr. et al. |
| 6,327,473 B1 | 12/2001 | Soliman |
| 6,327,479 B1 | 12/2001 | Mikkola |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,373,930 B1 | 4/2002 | McConnell et al. |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,430,504 B1 | 8/2002 | Gilbert |
| 6,433,734 B1 | 8/2002 | Krasner |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace et al. |
| 6,477,150 B1 | 11/2002 | Maggenti |
| 6,504,491 B1 | 1/2003 | Christians |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,525,687 B2 | 2/2003 | Roy |
| 6,525,688 B2 | 2/2003 | Chou |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | Fomukong |
| 6,560,534 B2 | 5/2003 | Abraham |
| 6,570,530 B2 | 5/2003 | Gaal |
| 6,574,558 B2 | 6/2003 | Kohli |
| 6,580,390 B1 | 6/2003 | Hay |
| 6,584,552 B1 | 6/2003 | Kuno |
| 6,594,500 B2 | 7/2003 | Bender |
| 6,597,311 B2 | 7/2003 | Sheynblat |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockheart |
| 6,628,233 B2 | 9/2003 | Knockheart |
| 6,633,255 B2 | 10/2003 | Krasner |
| 6,640,184 B1 | 10/2003 | Rabe |
| 6,650,288 B1 | 11/2003 | Pitt et al. |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockheart |
| 6,680,695 B2 | 1/2004 | Turetzky |
| 6,687,504 B1 | 2/2004 | Raith |
| 6,690,940 B1 | 2/2004 | Brown |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | van Diggelen |

(56) References Cited

U.S. PATENT DOCUMENTS

| | | |
|---|---|---|
| 6,704,651 B2 | 3/2004 | van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,731,940 B1 | 5/2004 | Nagendran |
| 6,731,956 B2 * | 5/2004 | Hanna et al. ............... 455/569.1 |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,854 B2 | 6/2004 | Berrier et al. |
| 6,744,858 B1 | 6/2004 | Ryan et al. |
| 6,745,038 B2 | 6/2004 | Callaway, Jr. |
| 6,747,596 B2 | 6/2004 | Orler |
| 6,748,195 B1 | 6/2004 | Phillips |
| 6,751,463 B1 | 6/2004 | Lorello et al. |
| 6,751,464 B1 | 6/2004 | Burg |
| 6,756,938 B2 | 6/2004 | Zhao |
| 6,757,544 B2 | 6/2004 | Rangarajan |
| 6,771,742 B2 | 8/2004 | McCalmont et al. |
| 6,771,946 B1 | 8/2004 | Oyaski |
| 6,772,340 B1 | 8/2004 | Peinado |
| 6,775,356 B2 | 8/2004 | Salvucci et al. |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,050 B1 | 9/2004 | Krasner |
| 6,801,124 B2 | 10/2004 | Naitou |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Baucke et al. |
| 6,829,475 B1 | 12/2004 | Lee |
| 6,832,373 B2 | 12/2004 | O'Neill |
| 6,833,785 B2 | 12/2004 | Brown |
| 6,839,020 B2 | 1/2005 | Geier |
| 6,839,021 B2 | 1/2005 | Sheynblat |
| 6,842,449 B2 | 1/2005 | Hardjono |
| 6,842,715 B1 | 1/2005 | Gaal |
| 6,853,916 B2 | 2/2005 | Fuchs |
| 6,856,282 B2 | 2/2005 | Mauro |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor et al. |
| 6,873,854 B2 | 3/2005 | Crockett et al. |
| 6,885,940 B2 | 4/2005 | Brodie et al. |
| 6,888,497 B2 | 5/2005 | King et al. |
| 6,888,927 B1 | 5/2005 | Cruickshank |
| 6,888,932 B2 | 5/2005 | Snip et al. |
| 6,895,238 B2 | 5/2005 | Newell et al. |
| 6,895,249 B2 | 5/2005 | Gaal |
| 6,900,758 B1 | 5/2005 | Mann et al. |
| 6,903,684 B1 | 6/2005 | Simic et al. |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,915,208 B2 | 7/2005 | Garin |
| 6,917,331 B2 | 7/2005 | Gronemeyer |
| 6,922,565 B2 | 7/2005 | Rhodes et al. |
| 6,930,634 B2 | 8/2005 | Peng |
| 6,937,187 B2 | 8/2005 | Van Diggelen |
| 6,937,872 B2 | 8/2005 | Krasner |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,956,467 B1 | 10/2005 | Mercado, Jr. |
| 6,957,073 B2 | 10/2005 | Bye |
| 6,961,562 B2 | 11/2005 | Ross |
| 6,965,754 B2 | 11/2005 | King |
| 6,965,767 B2 | 11/2005 | Maggenti |
| 6,970,917 B1 | 11/2005 | Kushwaha |
| 6,973,166 B1 | 12/2005 | Tsumpes |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,105 B1 | 1/2006 | Pitt et al. |
| 6,996,720 B1 | 2/2006 | DeMello |
| 6,999,782 B2 | 2/2006 | Shaughnessy |
| 7,024,321 B1 | 4/2006 | Deniger |
| 7,024,393 B1 | 4/2006 | Peinado |
| 7,047,411 B1 | 5/2006 | DeMello |
| 7,054,659 B2 * | 5/2006 | Gioscia et al. ............. 455/556.1 |
| 7,064,656 B2 | 6/2006 | Bekcher |
| 7,065,351 B2 | 6/2006 | Carter |
| 7,065,507 B2 | 6/2006 | Mohammed |
| 7,079,857 B2 | 7/2006 | Maggenti |
| 7,103,018 B1 | 9/2006 | Hasen |
| 7,103,574 B1 | 9/2006 | Peinado |
| 7,106,717 B2 | 9/2006 | Rosseau |
| 7,123,874 B1 | 10/2006 | Brennan |
| 7,136,838 B1 | 11/2006 | Peinado |
| 7,151,946 B2 | 12/2006 | Magennti |
| 7,209,969 B2 | 4/2007 | Lahti |
| 7,218,940 B2 | 5/2007 | Niemenna |
| 7,221,959 B2 | 5/2007 | Lindquist |
| D562,808 S * | 2/2008 | Gwee ........................ D14/223 |
| 744,342 A1 | 10/2008 | Hall |
| 7,450,935 B1 | 11/2008 | Link |
| 7,512,417 B2 * | 3/2009 | Cheng et al. ................. 455/557 |
| 7,522,182 B2 | 4/2009 | Bang |
| 7,603,148 B2 * | 10/2009 | Michalak ................ 455/575.2 |
| 7,693,511 B2 | 4/2010 | Bottrich |
| 7,693,546 B1 * | 4/2010 | Gioscia et al. ............. 455/556.1 |
| 7,925,246 B2 | 4/2011 | McKibben |
| 8,200,291 B2 | 6/2012 | Steinmetz |
| 8,265,326 B2 * | 9/2012 | Singh ........................ 381/374 |
| 8,284,980 B2 * | 10/2012 | Parker et al. ................. 381/384 |
| 2002/0003345 A1 | 1/2002 | Stanly |
| 2002/0037735 A1 | 3/2002 | Maggenti |
| 2002/0038182 A1 | 3/2002 | Wong |
| 2002/0052214 A1 | 5/2002 | Maggenti |
| 2002/0061760 A1 | 5/2002 | Maggenti |
| 2002/0069529 A1 | 6/2002 | Wieres |
| 2002/0102999 A1 | 8/2002 | Maggenti |
| 2002/0112047 A1 | 8/2002 | Kushwaha |
| 2002/0173317 A1 | 11/2002 | Nykanen |
| 2003/0009602 A1 | 1/2003 | Jacobs |
| 2003/0037163 A1 | 2/2003 | Kitada |
| 2003/0065788 A1 | 4/2003 | Salomaki |
| 2003/0078064 A1 | 4/2003 | Chan |
| 2003/0081557 A1 | 5/2003 | Mettala |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0119528 A1 | 6/2003 | Pew |
| 2003/0122669 A1 | 7/2003 | Filippov |
| 2003/0151507 A1 | 8/2003 | Andre |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0165237 A1 | 9/2003 | Farr |
| 2003/0204640 A1 | 10/2003 | Sahinaja |

(56) References Cited

U.S. PATENT DOCUMENTS

| | | |
|---|---|---|
| 2003/0223381 A1 | 12/2003 | Schroderus |
| 2003/0224840 A1 | 12/2003 | Frank |
| 2004/0002326 A1 | 1/2004 | Maher |
| 2004/0044623 A1 | 3/2004 | Wake |
| 2004/0064550 A1 | 4/2004 | Sakata |
| 2004/0068724 A1 | 4/2004 | Gardner |
| 2004/0077359 A1 | 4/2004 | Bernas |
| 2004/0090121 A1 | 5/2004 | Simonds |
| 2004/0158371 A1 | 8/2004 | Iggulden |
| 2004/0190497 A1 | 9/2004 | Knox |
| 2004/0198332 A1 | 10/2004 | Lundsgaard |
| 2004/0203692 A1 | 10/2004 | Schwinke |
| 2004/0204806 A1 | 10/2004 | Chen |
| 2004/0205151 A1 | 10/2004 | Sprigg |
| 2004/0209594 A1 | 10/2004 | Naboulsi |
| 2004/0229632 A1 | 11/2004 | Flynn |
| 2005/0003797 A1 | 1/2005 | Baldwin |
| 2005/0009576 A1 | 1/2005 | Van Bosch |
| 2005/0028034 A1 | 2/2005 | Gantman |
| 2005/0039178 A1 | 2/2005 | Marolia |
| 2005/0041578 A1 | 2/2005 | Huotari |
| 2005/0080519 A1 | 4/2005 | Oesterling |
| 2005/0086467 A1 | 4/2005 | Asokan |
| 2005/0090236 A1 | 4/2005 | Schwinke |
| 2005/0107132 A1 | 5/2005 | Kamdar |
| 2005/0112030 A1 | 5/2005 | Gauss |
| 2005/0201357 A1 | 9/2005 | Poyhonen |
| 2005/0209995 A1 | 9/2005 | Aksu |
| 2005/0259675 A1 | 11/2005 | Tuohino |
| 2005/0260994 A1 | 11/2005 | Losch |
| 2006/0007920 A1 | 1/2006 | Michel |
| 2006/0053225 A1 | 3/2006 | Poikleska |
| 2006/0092023 A1 | 5/2006 | Hofbeck |
| 2006/0092773 A1 | 5/2006 | Hsu |
| 2006/0212558 A1 | 9/2006 | Sahinoja |
| 2006/0212562 A1 | 9/2006 | Kushwaha |
| 2006/0233317 A1 | 10/2006 | Coster |
| 2006/0234639 A1 | 10/2006 | Kushwaha |
| 2006/0234698 A1 | 10/2006 | Folk |
| 2007/0026854 A1 | 2/2007 | Nath |
| 2007/0030539 A1 | 2/2007 | Nath |
| 2007/0042765 A1 | 2/2007 | Bailin |
| 2007/0259701 A1 | 11/2007 | Mirvis |
| 2008/0156842 A1 | 7/2008 | Panasik |
| 2008/0268769 A1 | 10/2008 | Brown |
| 2009/0029675 A1 | 1/2009 | Steinmetz |
| 2010/0167691 A1 | 7/2010 | Howarter |
| 2011/0109468 A1 | 5/2011 | Hirschfeld |

OTHER PUBLICATIONS

International Search Report received in PCT/US2011/001205 dated Nov. 17, 2011.

"Technology Rides Control Network to Support Short Package Applications"; Advanced Intelligent Network New. Washington, DC: Mar. 19, 1997. vol. 7, Iss. 6; p. 1.

Cellular Mobile Pricing Structures and Trends; Dr. Sam Paltridge of the OECD's Directorate for Science, Technology and Industry; Dist.: May 19, 2000 (Nov. 1999).

ETSI,3GPP, $3^{rd}$ Generation Partnership Project; Technical Specification Group Core Network; Customized Applications for Mobile network Enhanced Logic; (CAMEL) Phase 3—Stage 2 (3G TS 23.078 version 3.3.0), 12/199, pp. 300-329.

Nextlink, "Introducing a New Prepaid Telephone Service from Nextlink," sales literature, undated.

The Power of Mobile Unified Messaging: Siemans and Comverse to Demonstrate WAP-Based Messaging Applications on Live GPRS System, Comverse, Feb. 2000.

Tecore, Inc., "Pre-Paid Cellular," sales literature, Mar. 25, 1997, pp. 1-4.

Bond, "Cellular Carriers Use Prepaid Programs to Reach Untapped Markets," Billing World, Mar. 1997, pp. 14-17.

MultiMedia Publishing Corp., "Prepaid Cellular and Prepaid Wireless Market Report and Forecast 1997-2002," sales literature, undated.

ETSI/3Gpp, $3^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.

Haynes, Jr., The Ever Changing Face of 911, MSAG, Jun. 2005, pp. 1-2.

Proximity Media, How the Bluetooth Media Server Works, Aug. 23, 2006 pp. 1-3.

PCT International Search Report (PCTUS2007/16138) and Written Opinion of International Searching Authority, Feb. 7, 2008.

de Carla, Powering Location Based Solutions, Marketpalce, 2006, pp. 1-2.

PCT Search Report issued in PCT/US008/13690 and mailed on Jan. 29, 2009.

International Search Report in PCT/US2007/20207 dated Apr. 1, 2008.

International Search Report in PCT/US2007/026132 dated Jun. 6, 2008.

International Search Report in PCT/US2007/20207 dated Oct. 30, 2008.

International Search Report in PCT/US2007/21133 dated Apr. 21, 2008.

Kim, J.Y., et al., "An Enhanced VoIP Emergency Services Prototype," Proceedings of the $3^{rd}$ International ISCRAM Conference, Newark, NJ, May 2006.

International Search Report received in PCT/US13/29789 dated May 7, 2013.

* cited by examiner

INTEGRATED, DETACHABLE EAR BUD DEVICE FOR A WIRELESS PHONE

BACKGROUND OF THE INVENTION

1. Field of the Invention

This invention relates generally to telecommunications. More particularly, it relates to an audio accessory for a wireless phone.

2. Background of the Related Art

Wireless phones today have the ability to provide very high sound quality and are often used as music players. Conventional wireless phones include one internal speaker for placement against the ear of a user (and sometimes an additional two internal speakers for rudimentary stereo output), and a microphone for picking up voice from the user. Many wireless phones are sold with separately packaged ear buds (and sometimes ear buds with a microphone) to plug into a phono jack on the wireless phone, bypassing an internal speaker, to enjoy personal audio output by their wireless phone. Ear buds are presumably expected to be carried in a clothing pocket, purse, etc. when not in use. In some cases a pouch is provided for a wireless phone to be stored together with a set of ear buds.

Some conventional ear buds include a microphone, permitting use of the wireless phone as a phone via wired ear buds. Wireless earpiece and microphone devices are also known, communicating with the wireless phone via a piconet connection such as BLUETOOTH™. Some wireless auditory devices come with a case for storing the wireless auditory device, sometimes including a built-in recharge port (e.g., Plantronics Discovery 975). Wireless phones are suspected by some to emit small levels of radiation. Some experts believe that these levels of radiation may be harmful, while many if not most do not. Though not all experts agree if mobile phones can cause long-term, permanent damage, most generally agree that keeping a wireless phone away from the user's body, especially away from their head and ears, would diminish any possible risk of harm from mobile phone radiation if it exists.

SUMMARY OF THE INVENTION

In accordance with the principles of the present invention, a wireless phone audio system comprises an audio driver, and an internal speaker. An integrated, detachable ear bud physically attaches to a case of an associated wireless phone. A proximity sensor directs audio output from the audio driver to the integrated, detachable ear bud when the integrated, detachable ear bud is physically detached from the case of the associated wireless phone.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present inventors have appreciated that an ear bud, a pair of ear buds, or ear buds including a microphone, are often misplaced, separated from the wireless phone for which they are intended for use with, and/or simply lost. The present invention provides an integrated, detachable ear bud system that is integrated and attached to an associated wireless phone.

In certain embodiments the present invention provides an integrated, detachable, attached auditory device that is physically connected to its associated wireless phone via an extendable and retractable electrical cord, and integrated into the case of the associated wireless phone. By integrating the integrated, detachable ear buds into the case of the wireless phone itself, the integrated, detachable ear buds are forcibly kept with the wireless phone even when not in use, preventing misplacement, loss, or even inadvertent separation from the wireless device.

Figure 1A:
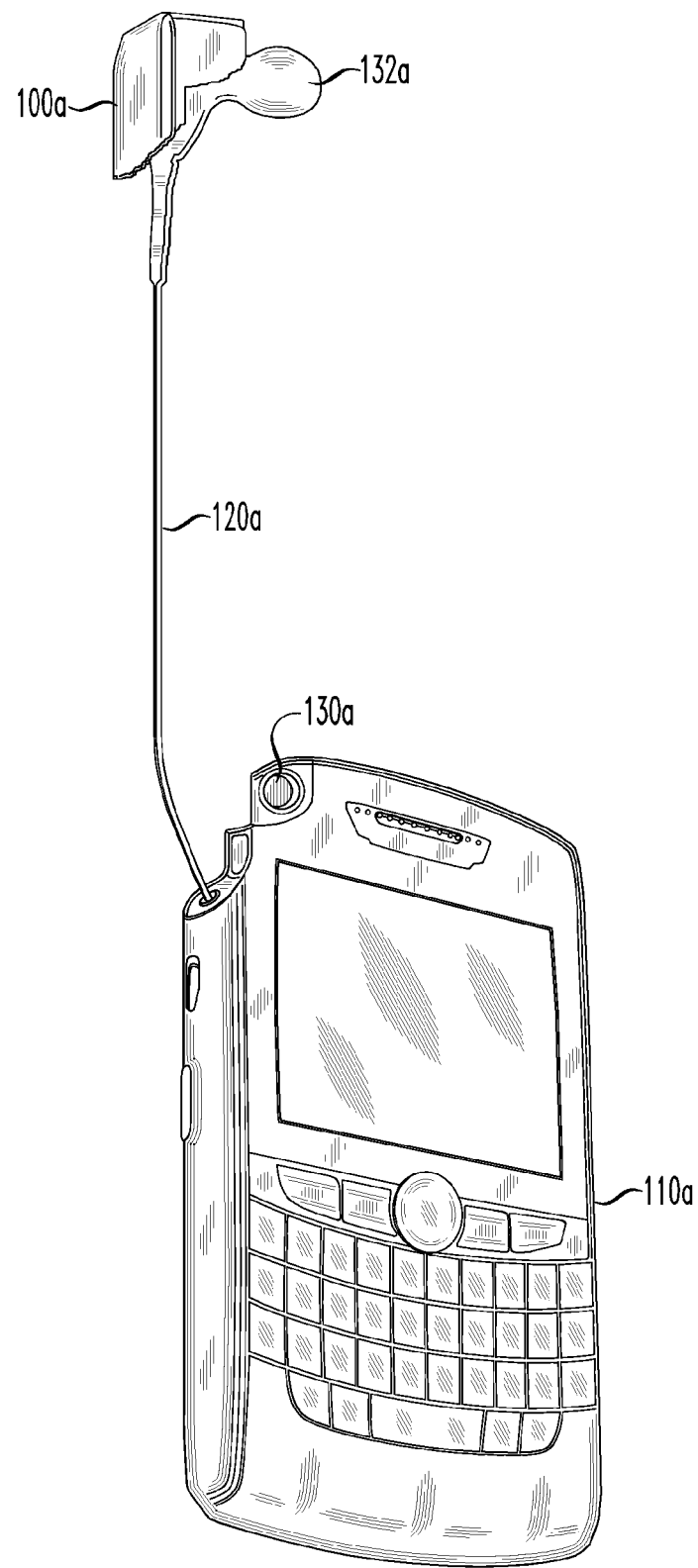
FIG. 1A shows a first exemplary style wireless phone with an integrated, detachable, extendable/retractable hardened earphone, microphone, and connection cord (herein after referred to collectably as "retractable device") for use with a mobile phone, in accordance with the principles of the present invention.

FIG. 1A shows a first exemplary style mobile phone with an integrated, detachable, extendable/retractable hardened earphone, microphone, and connection cord (herein after referred to collectably as "retractable device") for use with a mobile wireless phone, in accordance with the principles of the present invention.

In particular, as shown in FIG. 1A, a wireless phone 110a includes an integrated, detachable ear bud 100a. The integrated, detachable ear bud 100a includes an ear-mountable speaker 132a, and an electrical cord 120a between the ear-mountable speaker 132a and an output driver within the wireless phone 110a. In the disclosed embodiment, when the integrated, detachable ear bud 100a is attached to the wireless phone 110a in its attached home position, the ear-mountable speaker 132a may tuck into a mating cavity 130a to assist in physical positioning and attaching of the integrated, detachable ear bud 100a to the case of the wireless phone 110a.

Any suitable plastic or metal releasable latch that catches when the integrated, detachable ear bud 100a is pushed into its attached home position may be implemented. The releasable latch may be released blindly with suitable separation pressure applied to separate or detach the integrated, detachable ear bud 100a from the wireless phone 110a. Alternatively the releasable latch may be released when an associated button on the case of the wireless phone 110a is pressed or otherwise activated. The release latch may alternatively be software activated with an electrical solenoid, magnet, or the like. The integrated, detachable ear buds 100a may be latched with a suitable rare earth magnet mounted within the case of the wireless phone 110a and/or within the ear bud 100a.

In the embodiment of the integrated, detachable ear bud device shown in FIG. 1A, the integrated, detachable ear bud 100a is physically connected or attached to the case of the wireless phone 110a, and includes a retractable electrical audio cord connecting the integrated, detachable ear bud 100a to the respective audio output driver within the wireless phone 110a.

The retractable, integrated, detachable audio system can be comprised of a single ear bud (e.g., suitable for listening to radio, etc.), or of a pair of ear buds (e.g., left-side and right-side ear buds) suitable for higher-end audio applications (e.g., music entertainment, movies, etc.)

Preferably the wireless phone 110a includes a home sensor switch that activates internal speaker(s) (and deactivates the speaker within the ear bud 100a) when the integrated, detachable ear bud 110a is in an attached home position attached to the wireless phone 110a, and deactivates internal speaker(s) (and activates audio to the ear bud 100a) when the integrated, detachable ear bud 100a is removed or detached from its attached home position. The home sensor switch may be a physical switch, or an inductive sensor switch.

In disclosed embodiments, each integrated, detachable ear bud 100a is preferably integrated into the case of its associated wireless phone 110a, e.g., integrated into the overall shape of the wireless phone 110a. For instance, the integrated, detachable ear bud 100a may be shaped to fill out a portion of the corner, side, or top edge of the case of the wireless phone 110a.

Integrated, detachable ear buds assure convenience, availability, and compatibility in an audio experience with respect to an associated wireless device 110a. Integrated, detachable ear buds also provide a hardened interface between a wireless phone 110a and an ear-mounted auditory component 100a via inclusion of an extendable/retractable audio cord 120a between the integrated, detachable ear bud 100a and its associated wireless device 110a.

Figure 1B:
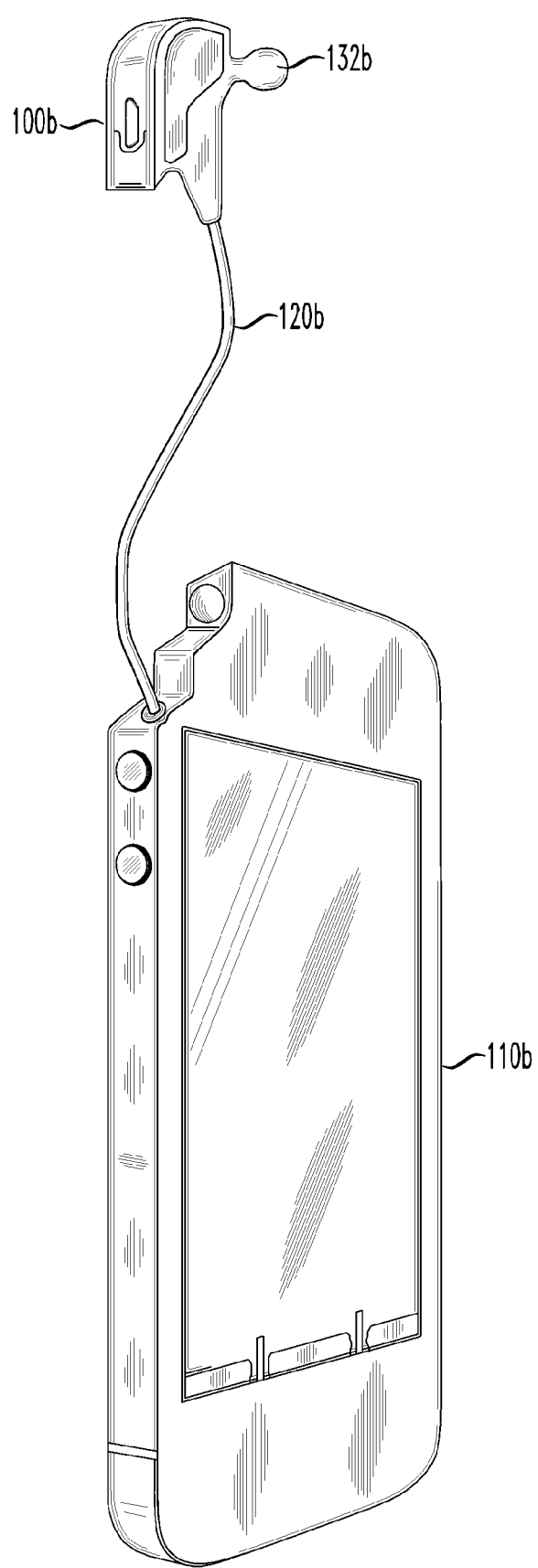
FIG. 1B shows another style wireless phone with an integrated, detachable, extendable/retractable hardened earphone, microphone, and connection cord for use with a different style mobile phone, in accordance with the principles of the present invention.

FIG. 1B shows another style mobile phone with an integrated, detachable, extendable/retractable hardened earphone, (and possibly microphone,) and connection cord for use with a different style mobile phone, in accordance with the principles of the present invention.

In particular, while FIG. 1A depicted a Blackberry™ style wireless phone 110a, the principles of the present invention relates to all styles of wireless phones, e.g., an iPhone™ as shown in FIG. 1B.

As shown in FIG. 1B, an integrated, detachable ear bud 100b including an ear speaker 132b is wired via an extendable/retractable audio electric cord 120b to the audio output driver of the wireless phone 110b.

Figure 1C:
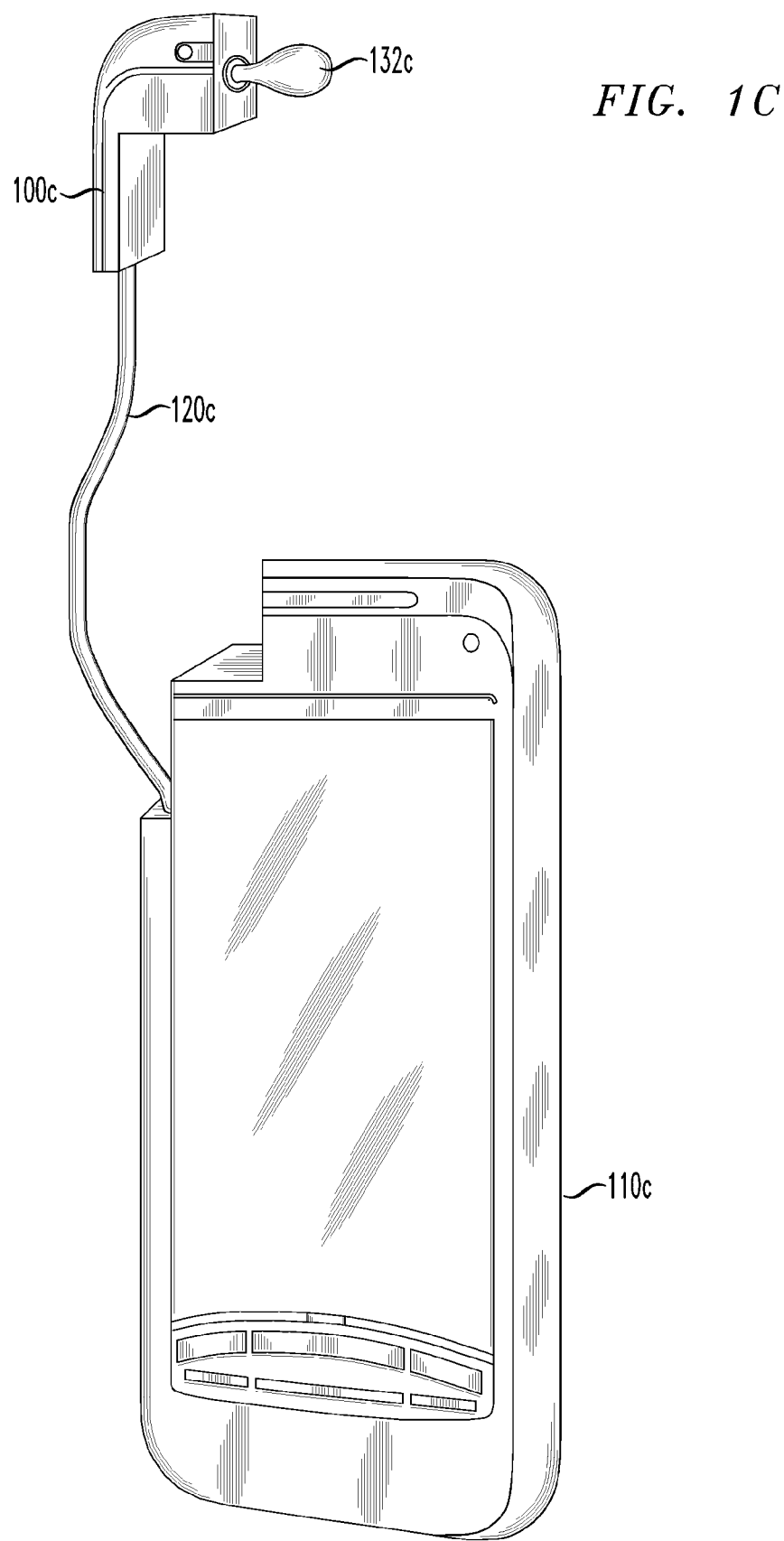
FIG. 1C shows yet another style wireless phone with an integrated, detachable, extendable/retractable hardened earphone, microphone, and connection cord for use with yet another style mobile phone, in accordance with the principles of the present invention.

FIG. 1C shows yet another style mobile phone with an integrated, detachable, extendable/retractable hardened earphone, (and possibly microphone,) and connection cord for use with yet another style mobile phone, in accordance with the principles of the present invention.

In particular, as shown in FIG. 1C, a wireless phone 110c includes an integrated, detachable ear bud 100c comprising an ear speaker 132c. As shown, the integrated, detachable ear bud 100c is wired to the audio output driver of the wireless phone 110c via an electrical audio cord 120c.

Figure 2:
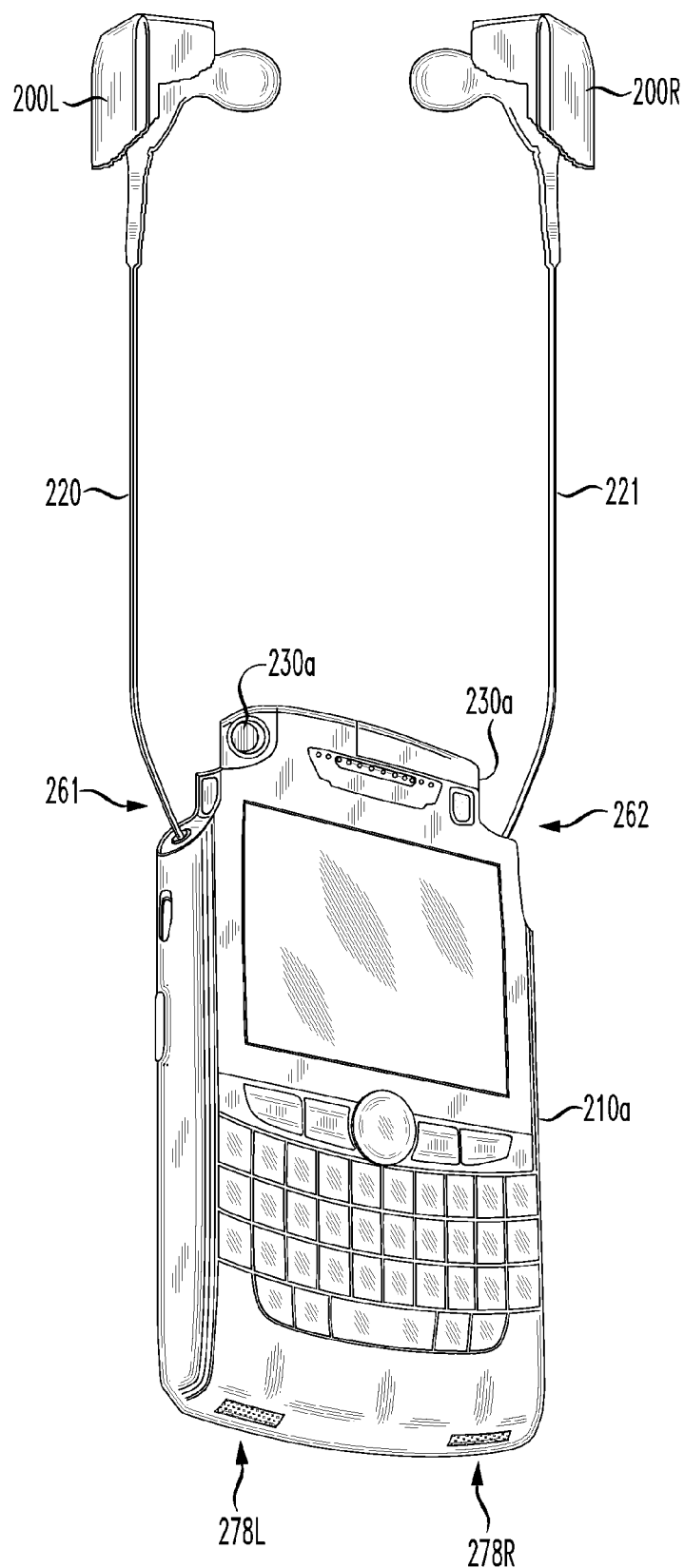
FIG. 2 shows an embodiment of a wireless phone with a pair of integrated, detachable, retractable ear buds, in accordance with the principles of the present invention.

FIG. 2 shows an embodiment of a mobile phone with a pair of integrated, detachable, retractable ear buds, in accordance with the principles of the present invention.

In particular, as shown in FIG. 2, a wireless phone 210a, e.g., of a Blackberry™ or any other style wireless phone, includes a pair of integrated, detachable ear buds 200L, 200R, that each have a respective extendable, retractable cord 220, 221 that coil into respective retraction mechanisms within the wireless phone 210a. Each integrated, detachable ear bud 200L, 200R, may have its own respective cord retraction mechanism within a cavity of the case of the wireless phone 210a. Alternatively, a singular cord retraction mechanism may be mounted within the cavity of the case of the wireless phone 210a between the two attached home positions 261, 262 for the integrated, detachable ear buds 200L, 200R, respectively such that extension and retraction of the integrated, detachable ear buds 200L, 200R are synchronized.

Ideally, separation of either integrated, detachable ear bud 200L, 200R from the case of the associated wireless device 210a causes audio switching between an associated internal speaker (or speakers) 278L, 278R of the wireless phone to the integrated, detachable ear bud 200L, 200R. For instance, when a left-side integrated, detachable ear bud 200L is separated from the case of the wireless phone 210a, audio that was previously routed to a left-side internal speaker 278L may be re-routed to the detached left-side integrated, detachable ear bud 200L. In another embodiment, whenever one integrated, detachable ear bud 200L or 200R is removed, all audio to any (if just one) or both internal speakers 278L, 278R (e.g., left-side and right-side audio) is re-routed to the detached integrated, detachable ear buds 200L, 200R.

Figure 3:
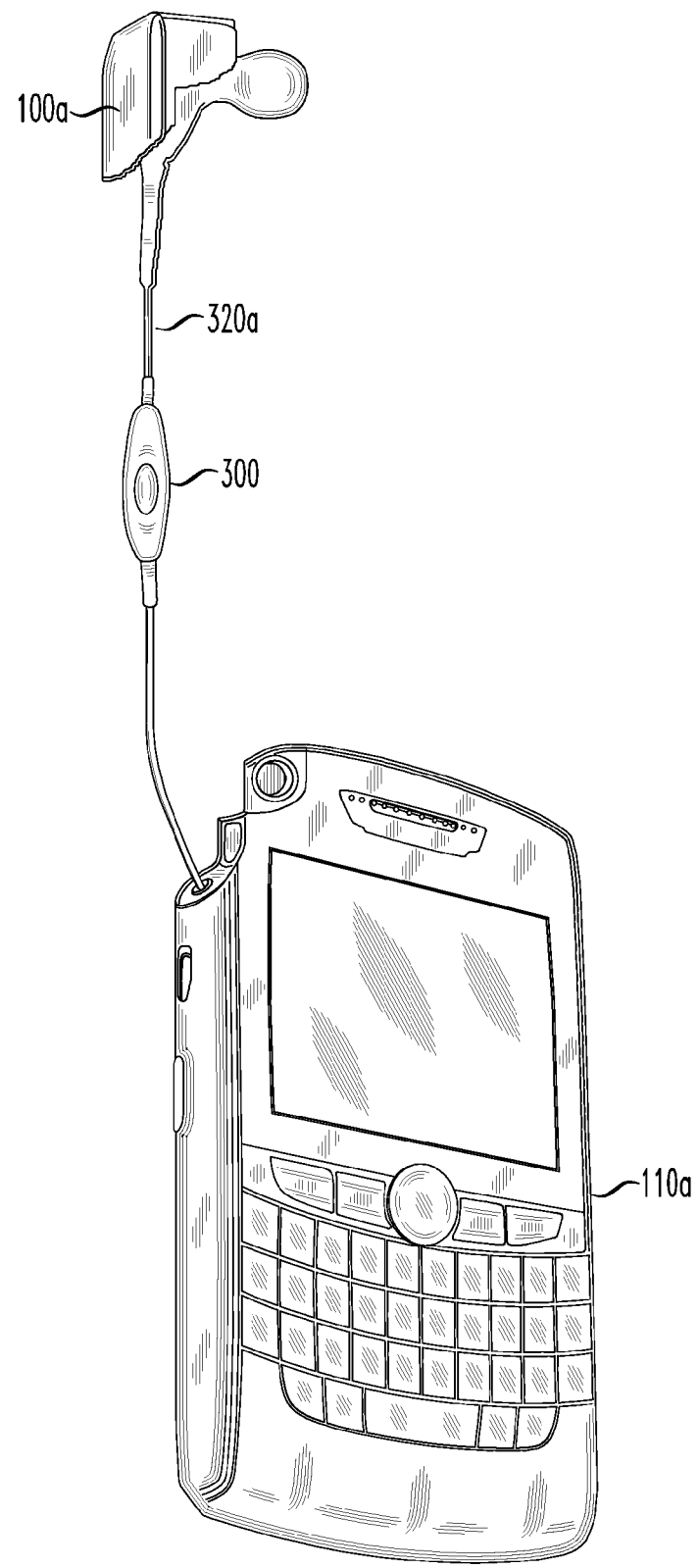
FIG. 3 shows another embodiment of a wireless phone with an integrated, detachable, retractable ear bud, including an in-line microphone, in accordance with the principles of the present invention.

FIG. 3 shows another embodiment of a mobile phone with an integrated, detachable, retractable ear bud, including an in-line microphone, in accordance with the principles of the present invention.

In particular, as shown in FIG. 3, the integrated, detachable, retractable audio device 100a may include an in-line microphone 300 at an appropriate position on the retractable cord 320a (or on the head of the integrated, detachable, retractable audio device 100a) so that a conversation can be conducted through the integrated, detachable, retractable ear bud 100a. In such embodiment physical accommodation is made within a retraction mechanism to absorb the in-line microphone 300 during retraction.

Figure 4:
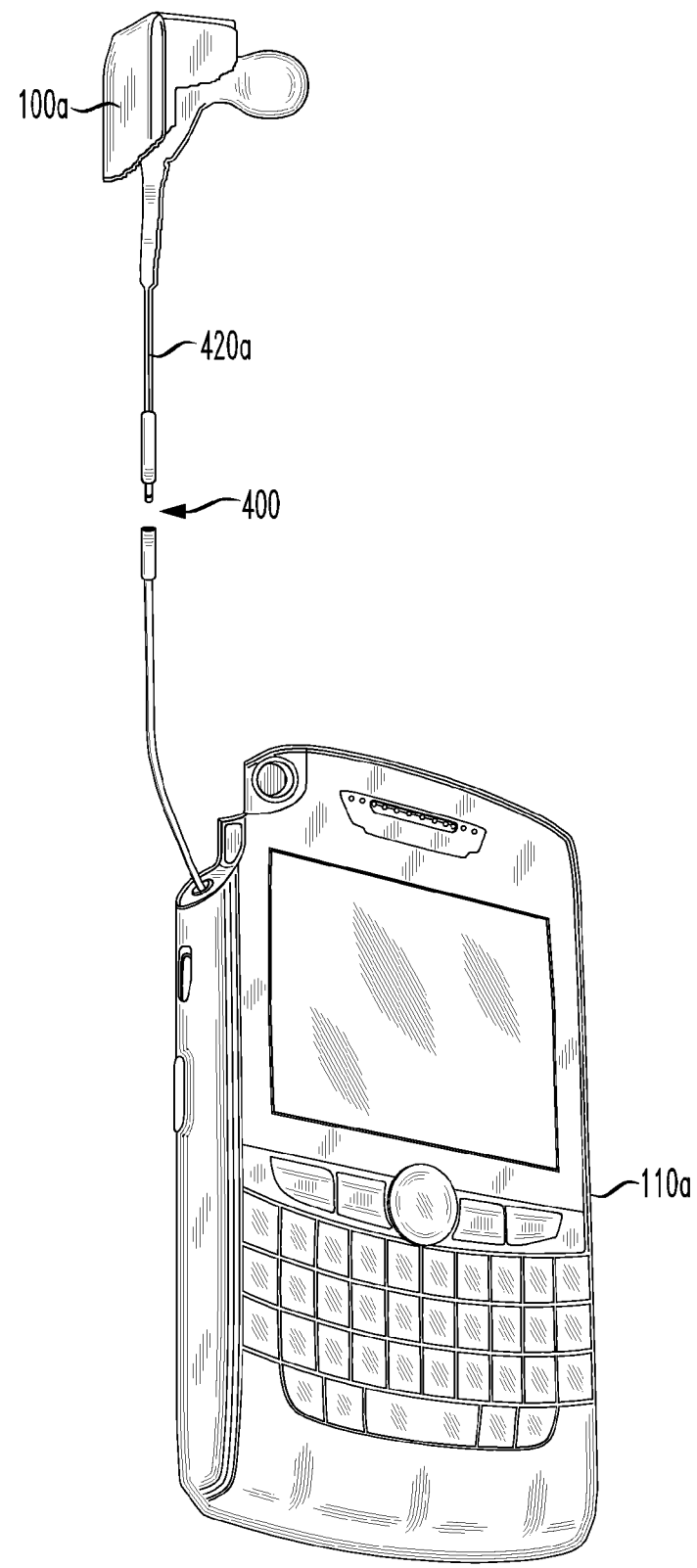
FIG. 4 shows yet another embodiment of a wireless phone with an integrated, detachable, retractable ear bud, with a separable connector in a wired connection, in accordance with the principles of the present invention.

FIG. 4 shows yet another embodiment of a mobile phone with an integrated, detachable, retractable ear bud, with a separable replacement connector in a wired connection, in accordance with the principles of the present invention.

In particular, as shown in FIG. 4, a wireless phone 110*a* including an integrated, detachable ear bud 100*a* may have a replacement connection or extension jack 400 enabling the retraction cord 420*a* to be separated such that the integrated, detachable ear bud 100*a* may be replaced, upgraded, etc.

The present inventors have appreciated that hardwired, integrated, detachable ear buds provide a greater sound quality than a wireless headset (e.g., a BLUETOOTH™ ear bud and microphone.) However, if wireless audio is acceptable, FIG. 5 shows an embodiment of a wireless phone with an integrated, detachable, singular wireless ear bud, in accordance with the principles of another aspect of the invention.

Figure 5:
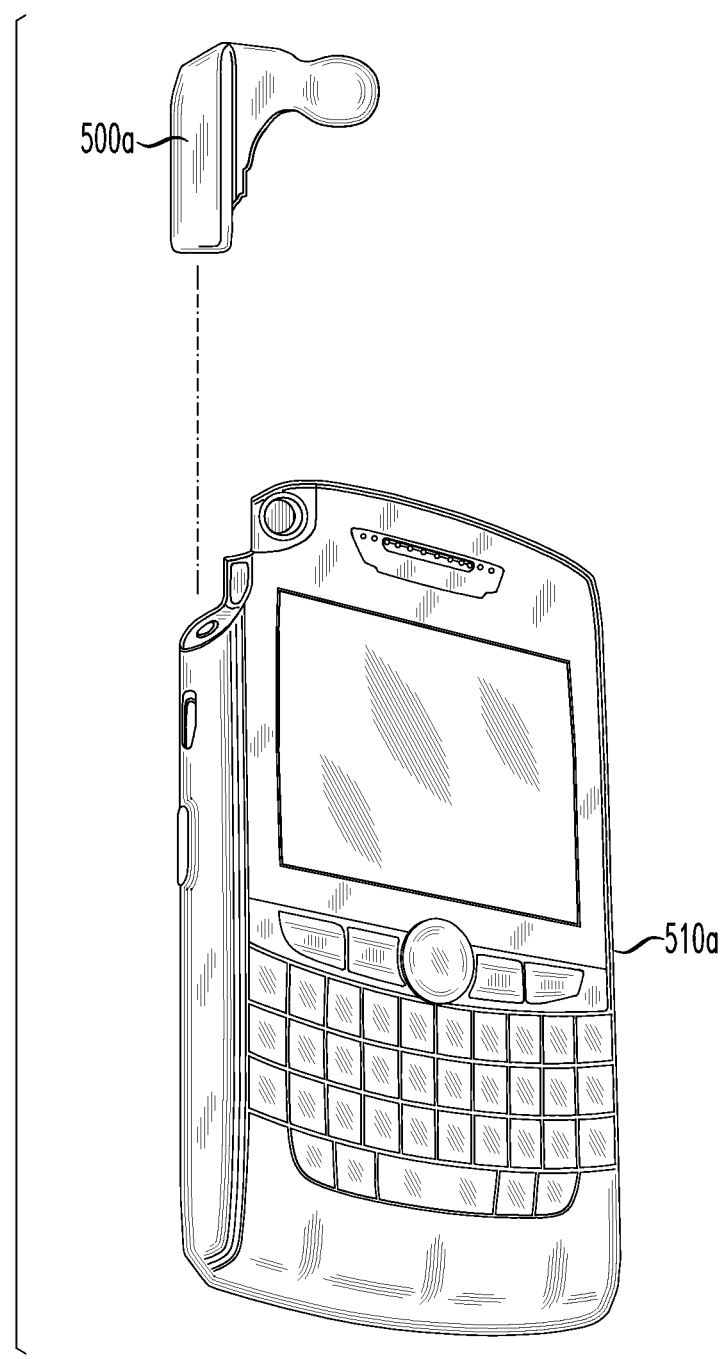
FIG. 5 shows an embodiment of a wireless phone with an integrated, detachable, singular wireless ear bud, in accordance with the principles of another aspect of the invention.

In particular, the embodiment of FIG. 5 shows a wireless connection between an integrated, detachable ear bud 500*a* and its associated wireless phone 510*a*.

In disclosed embodiments the wireless integrated, detachable ear bud 500*a* includes an internal rechargeable battery. The internal rechargeable battery may in certain low-cost applications instead by a non-rechargeable battery and occasionally replaced by the user.

The rechargeable battery of the wireless integrated, detachable ear bud 500*a* preferably is recharged by power from the wireless phone 510*a* when the integrated, detachable ear bud 500*a* is plugged into its attached, home position on the wireless phone 510*a*. To conserve battery power within the wireless phone 510*a* it is preferred that the recharge circuit that recharges the integrated, detachable ear bud 500*a* is activated to recharge the internal rechargeable battery of the integrated, detachable ear bud 500*a* only when the wireless phone 510*a* itself is being recharged or otherwise powered from an external power source external to the wireless phone 510*a*.

Compatibility between the wireless phone 510*a* and its associated integrated, detachable ear bud 500*a* is assured because the integrated, detachable ear bud 500*a* is integrated into, and detachably attached to, the wireless phone 510*a* itself. Conventional 'pairing' may be avoided or simplified as pairing information may be presumed by the wireless phone 510*a* when establishing its Bluetooth™ connection with the integrated, detachable ear bud 500*a*. However, even if 'pairing' is nevertheless required before the integrated, detachable wireless ear bud 500*a* may be fully activated, full conventional Bluetooth™ pairing may be accomplished to ensure that the integrated, detached ear bud 500*a* is readily available.

Figure 6:
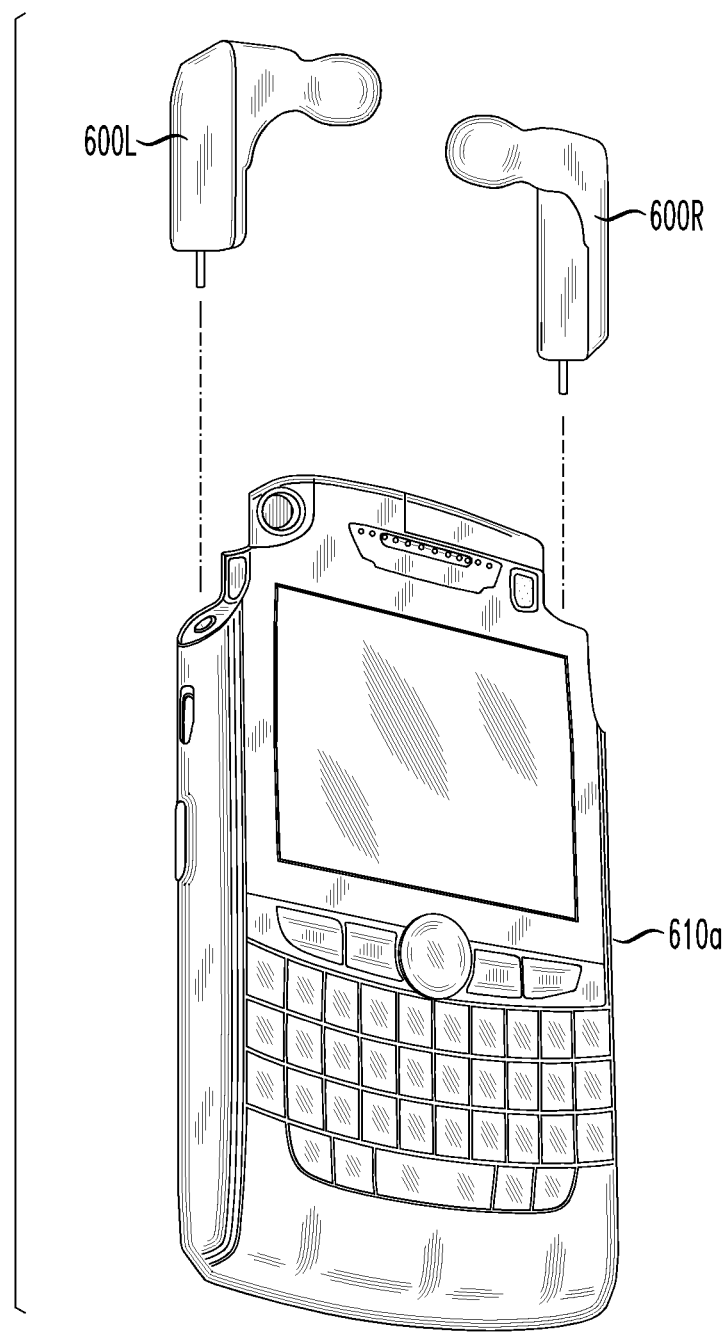
FIG. 6 shows an embodiment of a wireless phone with a pair of integrated, detachable, dual wireless ear buds, in accordance with the principles of the present invention.

FIG. 6 shows an embodiment of a mobile wireless phone 610*a* including a pair of integrated, detachable wireless ear buds 600L, 600R, in accordance with the principles of the present invention.

Figure 7:
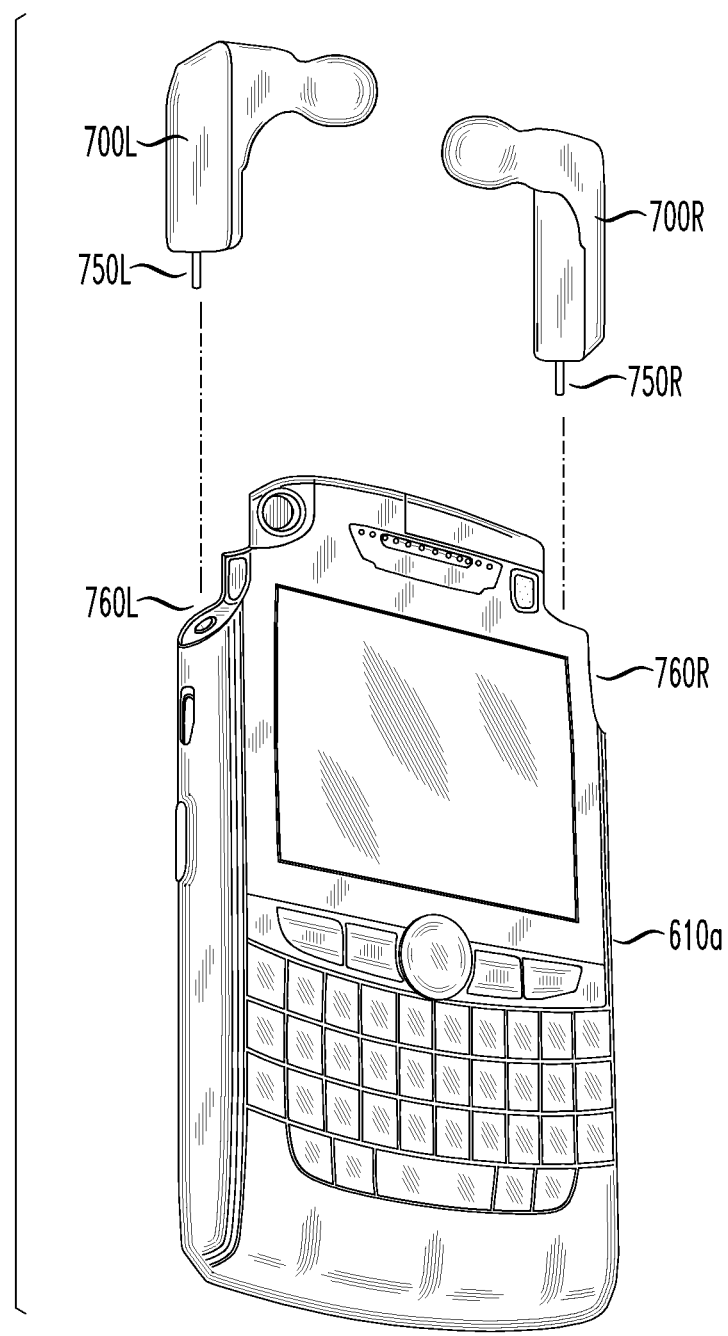
FIG. 7 shows an embodiment of a wireless phone with a pair of integrated, detachable, dual wireless ear buds, that are each mated with a battery recharge port when attached to the mobile phone, to enable recharging of said integrated, detachable, dual wireless ear buds, in accordance with the principles of the present invention.

FIG. 7 shows an embodiment of a wireless phone 610*a* with a pair of integrated, detachable, wireless ear buds 700L, 700R, that are each mated with a respective matching battery recharge port 760L, 760R, when placed in their respective attached home positions integrated into the case of the wireless phone 610*a*, to enable recharging of each integrated, detachable, wireless ear bud 700L, 700R, in accordance with the principles of the present invention.

As shown in FIG. 7, the integrated, detachable, wireless ear buds 700L, 700R has an electrical connector 750L, 760R to recharge their respective internal batteries when attached to the wireless phone 610*a*, as the electrical connectors 750L, 750R electrically mate with respective recharge ports 760L, 760R.

Ideally the charge to the recharge ports 760L, 760R is activated when the wireless phone 610*a* is itself connected to an external recharge power supply. However, the integrated, detachable, wireless ear buds 700L, 700R may be recharged by the internal main battery of the wireless phone 610*a*. However, if such battery-to-battery recharge is activated, it is preferred that such battery-to-battery recharge be disabled when the remaining power in the main battery of the wireless phone 610*a* drops below a given threshold, e.g., below 10%, at which time the recharge ports 760L, 760R connected to the electrical connectors 750L, 750R of the integrated, detachable, wireless ear buds 700L, 700R are preferably turned off to conserve battery power.

The recharge ports 760L, 760R (and matching electrical connectors 750L, 750R) may be of any suitable connector type, including, e.g., a straight power jack, a micro USB, etc.

Figure 8:
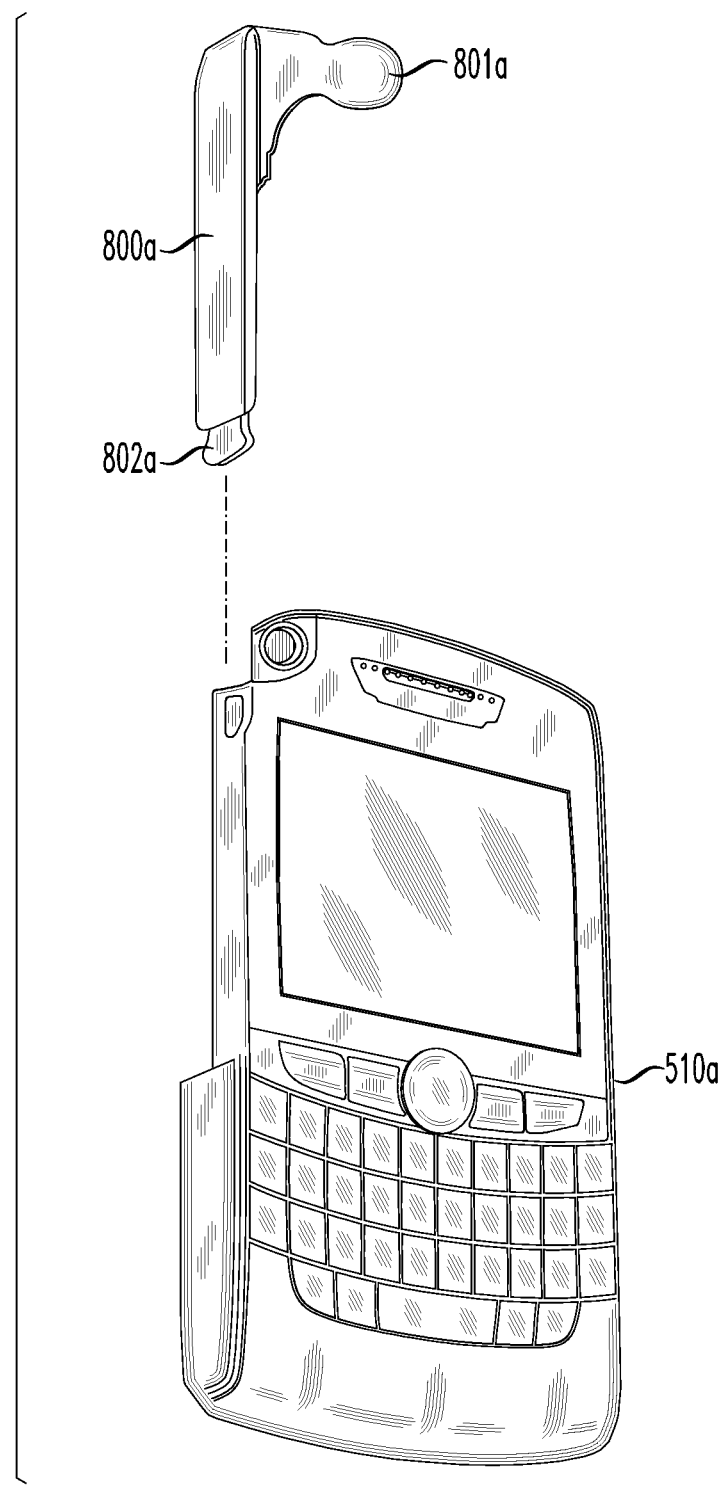
FIG. 8 shows an exemplary embodiment of a wireless jawbone earpiece/microphone, in accordance with another aspect of the present invention.

FIG. 8 shows an exemplary embodiment of a wireless jawbone earpiece/microphone 800*a*, in accordance with another aspect of the present invention.

In particular, as shown in FIG. 8, an integrated, detachable wireless "jawbone" ear bud 800*a* includes an ear bud speaker 801*a* with an attached microphone 802*a*. The integrated, detachable wireless jawbone ear bud 800*a* preferably includes an internal rechargeable battery, but can alternatively include a separate replaceable battery.

Figure 9:
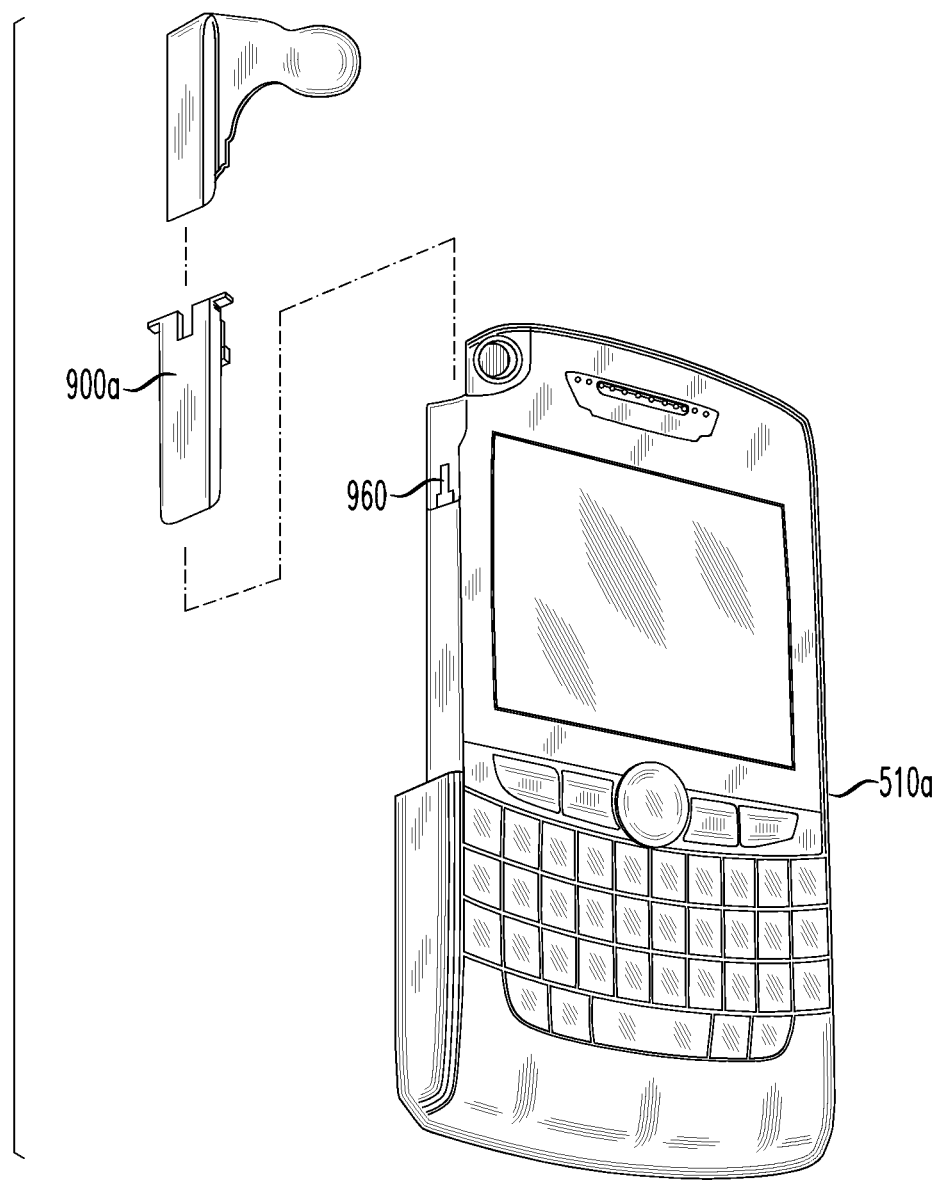
FIG. 9 shows an exemplary embodiment of a wireless jawbone earpiece/microphone including a recharge port for recharging the wireless jawbone earpiece/microphone when attached to its mating wireless phone, in accordance with the principles of the present invention.

FIG. 9 shows an exemplary embodiment of a wireless jawbone earpiece/microphone 900*a*, in accordance with still another aspect of the present invention.

In particular, as shown in FIG. 9, an integrated, detachable wireless "jawbone" ear bud 900*a* includes an electrical connector that mates with a recharge port 960 on the wireless phone 510*a* when the integrated, detachable wireless jawbone ear bud 900*a* is in its attached, home position on the wireless phone 510*a*.

The integrated, detachable wireless jawbone ear bud 900*a* preferably includes an internal rechargeable battery that can be recharged through the recharge port 960 when in an attached, home position on the wireless phone 510*a*. Alternatively, the integrated, detachable wireless jawbone ear bud 900*a* may be recharged on a matching remote recharge port separate from the wireless phone 510*a*. Alternatively, the integrated, detachable wireless jawbone ear bud includes a rechargeable battery that can be recharged when attached to an thus plugged into the wireless phone 510*a* while the wireless phone 510*a* too is recharging.

Unique left/right physical keying may be included between the integrated, detachable wireless ear buds 600L & 600R, or 700L & 700R, or integrated, detachable wireless jawbone earpiece/microphone to differentiate between a left-side and a right-side. Unique left/right physical keying would prevent a left-side ear bud from attaching to a designated right-side-associated portion of the wireless phone, and vice versa. In this way left-side audio may be consistently provided to what is expected to be a left ear of a user of the mobile phone, and vice versa for the right-side.

The present invention anticipates accommodation for advancement of audio devices by enabling replacement of the integrated, detachable ear buds (or wireless jawbone) for repair or upgrade. For instance, in one embodiment, an extendable/retractable cord of the integrated, detachable ear buds is removable by release of a set screw, or by release of a latch accessed through a small opening in the case of the wireless phone (e.g. using the end of a small paper clip.) Preferably, since integrated with a given model wireless phone, the integrated, detachable ear bud(s) are manufactured by an original equipment manufacturer (OEM) of the wireless phone itself.

The invention addresses a number of problems related to health, convenience, and performance of wireless accessories provided by the current marketplace. Any individual using a mobile phone with an integrated, detachable ear bud, whether for conversation or their listening pleasure, benefits.

A significant benefit from the use of an integrated, detachable ear bud system in accordance with the principles of the present invention is that it enables a wireless phone to provide a radiation-safe, secure, superior sound experience as the ear buds may be designed specifically to the needs of the attached wireless phone. Another benefit from the use of integrated, detachable ear buds is that it provides significant separation between an operating wireless phone and the head of a user, thereby keeping any possible harmful radio wave radiation even more safely away from the head of a user.

While the invention has been described with reference to the exemplary embodiments thereof, those skilled in the art will be able to make various modifications to the described embodiments of the invention without departing from the true spirit and scope of the invention.

What is claimed is:

1. A wireless phone audio system, comprising:
   an audio driver;
   an internal speaker;
   an integrated, corner shaped detachable ear bud that physically attaches to a corner portion of a case of an associated wireless phone; and
   a proximity sensor to direct audio output from said audio driver to said integrated, detachable ear bud when said integrated, detachable ear bud is physically detached from said case of said associated wireless phone.

2. The wireless phone audio system according to claim 1, wherein:
   said integrated, detachable ear bud remains electrically connected to said wireless phone both when said integrated, detachable ear bud is attached to and detached from said case of said associated wireless phone.

3. The wireless phone audio system according to claim 1, wherein:
   said proximity sensor further directs audio output from said audio driver to said internal speaker when said integrated, detachable ear bud is attached to said case of said associated wireless phone.

4. The wireless phone audio system according to claim 1, wherein:
   said integrated, detachable ear bud is attached to said case of said wireless phone with an earth magnet.

5. The wireless phone audio system according to claim 1, wherein:
   said earth magnet is mounted within said case of said wireless phone.

6. The wireless phone audio system according to claim 1, wherein:
   said integrated, detachable ear bud is attached to said case of said wireless phone with a physical latch.

7. The wireless phone audio system according to claim 6, wherein:
   said physical latch is releasable by said wireless phone under software control.

8. The wireless phone audio system according to claim 1, wherein:
   a speaker portion of said integrated, detachable ear bud inserts into a mating cavity in a case of said associated wireless phone when said integrated, detachable ear bud is operably attached to said case of said wireless phone.

9. The wireless phone audio system according to claim 1, further comprising:
   an internal microphone;
   wherein said proximity sensor directs sound input to said internal microphone to an audio input of said wireless phone when said integrated, detachable ear bud is physically attached to said case of said associated wireless phone.

10. The wireless phone audio system according to claim 1, wherein said integrated, detachable ear bud further comprises:
    an ear speaker; and
    a microphone;
    wherein said proximity sensor directs sound input to said microphone to an audio input of said wireless phone when said integrated, detachable ear bud is physically detached from said case of said associated wireless phone.

11. The wireless phone audio system according to claim 10, wherein:
    said microphone is a jawbone microphone.

12. The wireless phone audio system according to claim 1, further comprising:
    a retractable electrical cord between said internal, detachable ear bud and said wireless phone;
    wherein said electrical cord retracts within said case of said wireless phone when said integrated, detachable ear bud is physically attached to said case of said wireless phone.

13. The wireless phone audio system according to claim 1, further comprising:
    an additional integrated, detachable ear bud that physically attaches to a case of said associated wireless phone;
    wherein said integrated, detachable ear bud and said additional integrated, detachable ear bud output stereo audio.

* * * * *